March 6, 1934.　　C. G. CHALLINOR　　1,949,991
CONVEYER SYSTEM FOR HANDLING WASHING MACHINE
TUBS DURING THE PROCESS OF ENAMELING
Filed March 4, 1931　　3 Sheets-Sheet 1
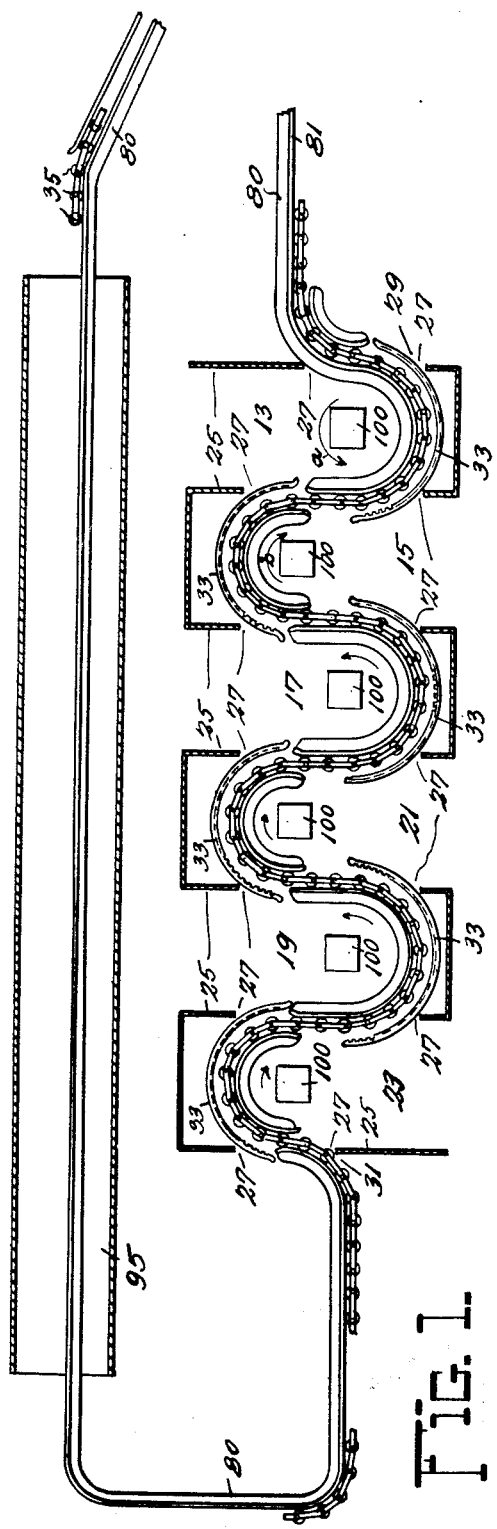
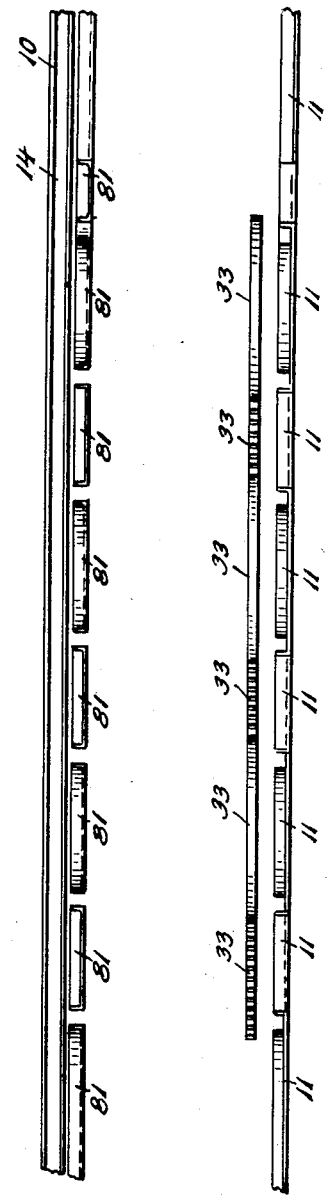
Inventor
CHARLES G. CHALLINOR.
By Robert Cobb
Attorneys

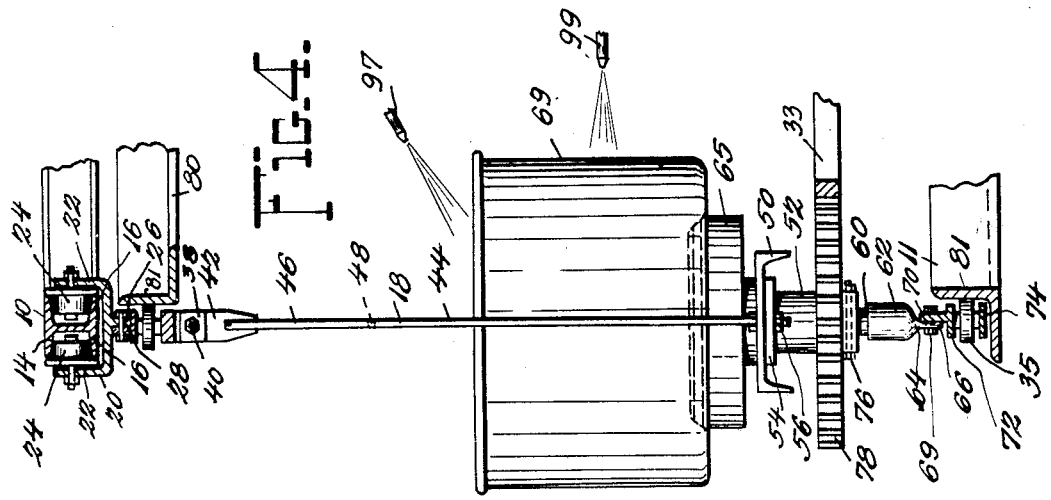
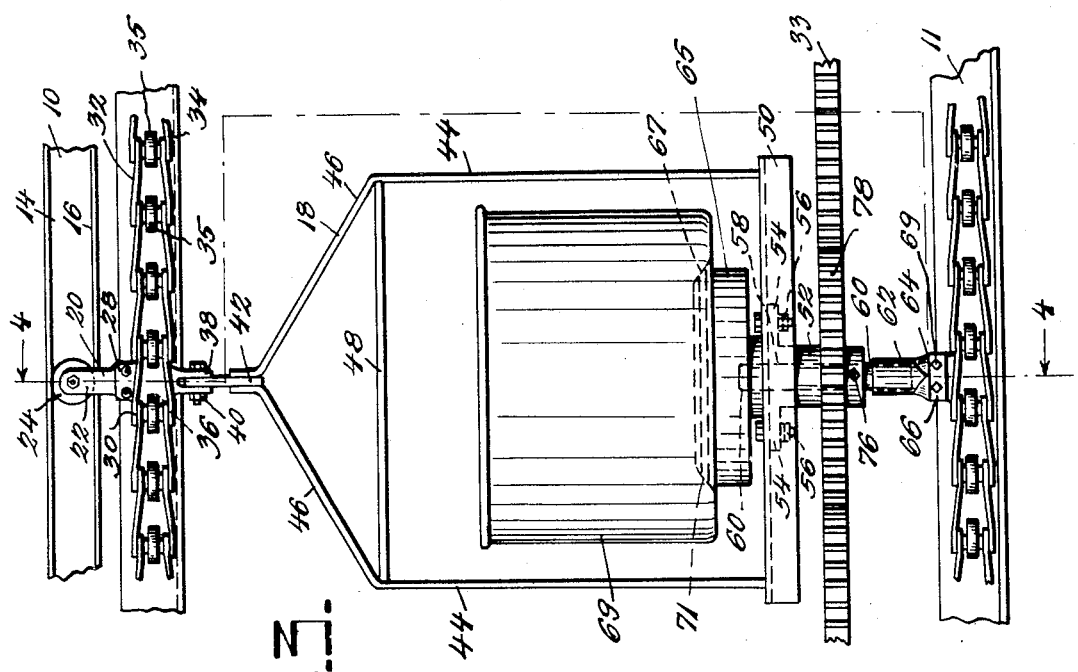

March 6, 1934.  C. G. CHALLINOR  1,949,991
CONVEYER SYSTEM FOR HANDLING WASHING MACHINE
TUBS DURING THE PROCESS OF ENAMELING
Filed March 4, 1931   3 Sheets-Sheet 3
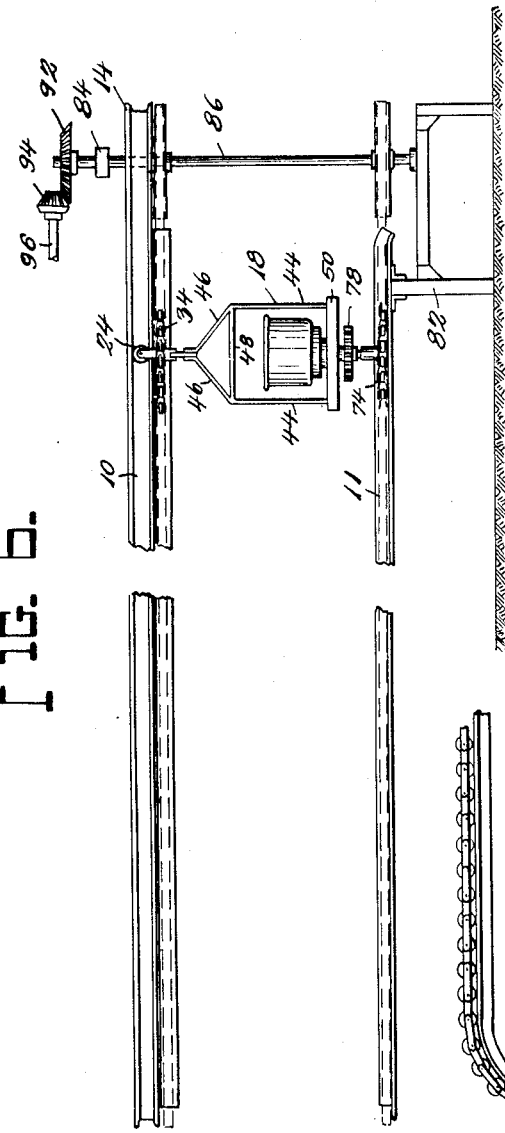
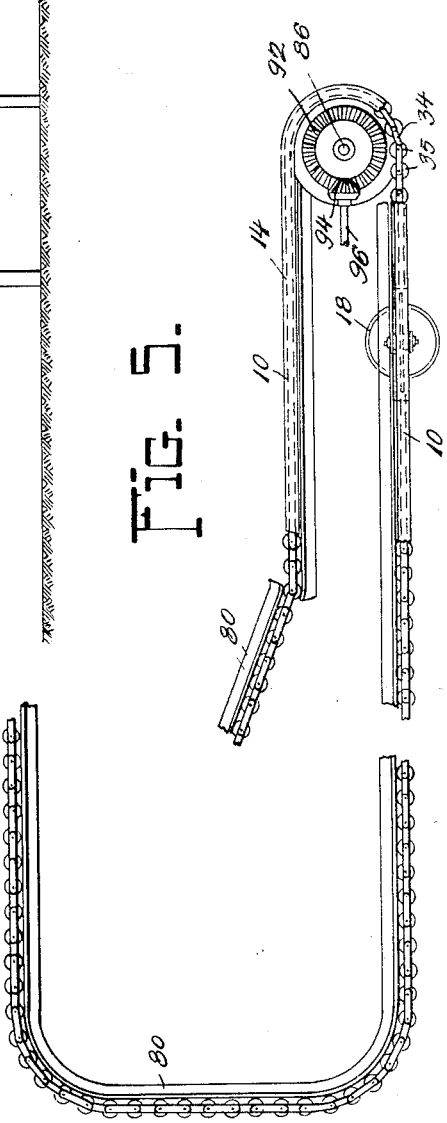
Inventor
CHARLES G. CHALLINOR.
By Robb H Robb
Attorneys Patented Mar. 6, 1934

1,949,991

UNITED STATES PATENT OFFICE 1,949,991

CONVEYER SYSTEM FOR HANDLING WASHING MACHINE TUBS DURING THE PROCESS OF ENAMELING

Charles G. Challinor, Cleveland, Ohio, assignor to The Colonial Iron Works Company, Cleveland, Ohio, a corporation Application March 4, 1931, Serial No. 520,176

13 Claims. (Cl. 91—60)

The conveyer system comprising the present invention is primarily adapted for use in connection with the enameling of open-ended cylindrical washing machine tubs, although the principles of the invention may be extended to include painting, enameling, or otherwise treating receptacles or other articles.

Heretofore, in the enameling of washing machine tubs it has been customary to transport the tubs in series upon an overhead conveying system from an initial point of loading. A number of spraying booths are established at suitable locations along the conveyer system at one side thereof and as the tubs arrive at the spraying booths, the operators respectively assigned to the various booths manually remove the tubs from the conveyer system and place them upon rotary turntables mounted within the booths which are driven in series from a suitable power source. The operators standing upon elevated platforms in their respective booths are enabled to spray both the inside and the outside of the tubs with enamel. When the enameling of the tubs has been completed, the operators manually remove the tubs from the rotary turntables and place them on a second conveyer system arranged along the opposite side of the spraying booths. The tubs on this second conveyer system are then conducted through a suitable drier and are removed at a suitable unloading point from whence they are transported to the baking furnaces or to some other process.

There are numerous disadvantages attendant upon this method of enameling the washing machine tubs. First among these is the relatively high cost of labor incident upon the number of operators that must be employed in removing the washing machine tubs from the first conveyer and placing the same upon their respective turntables. These operators are subsequently, after a period of idleness in which the tubs are being sprayed, obliged to remove the tubs from the turntables and place them upon the second conveyer for transportation to the driers. In addition to the high labor costs, it frequently happens that because of the large amount of handling of the conveyers that is required, considerable damage, even with the most cautious and skillful operators, results. When the enamel has been scratched fingermarked, or otherwise defaced on any one of the tubs, this tub must be rejected and subjected to a repetition of the process or otherwise one or more refinishing operators must be employed to touch up the defective work, thereby materially adding to the cost of production. Indeed, so high is the cost of mass production of the tubs in accordance with this method of enameling that the method has generally fallen into disfavor.

The principal object of the present invention, therefore, is to provide an apparatus by which the washing machine tubs may be enameled that will eliminate most of the existing difficulties encountered in the present-day method employed in enameling the tubs under conditions of mass production.

Specifically, the paramount object of the invention is to provide an apparatus whereby the tubs may be manufactured at a minimum cost by virtue of a reduction in the amount of skilled labor required.

Another object of the invention is to provide an apparatus for enameling washing machine tubs which will result in little or no damage to the tubs and which will, therefore, eliminate the necessity of refinishing operations and which will consequently, under conditions of mass production, produce finished articles of a uniform appearance.

Yet another object of the invention is to provide a conveying system for continuously transporting the tubs or articles in series through the enameling process and from thence through the drying process to a point of distribution without the necessity of removal from the conveyer or of other manual handling of the tubs.

A still further object of the invention is to provide an apparatus of the character described which is extremely simple in its construction and which is comprised of a relatively few number of moving parts, yet one which is rugged and durable and which consequently is unlikely to get out of order.

In order to accomplish the above aims and objects, the invention contemplates the provision of an endless conveyer adapted to successively and continuously receive the tubs to be treated. The conveyer transports the tubs through a series of spraying booths in which the tubs are maintained on the conveyer at the proper level for spraying with enamel and also in which the tubs are automatically revolved without removal from the conveyer. The booths are arranged in series along the conveyer and provision is made for conducting the tubs as they emerge from the last spraying booth in the series through a drier while still on the conveyer, to a point of discharge.

Convenience of arrangement of parts, simplicity, and comparative inexpense, both of manufacture and of operation, are further disideratum that have been borne in mind in the production and development of the present invention.

Other objects of the invention, not at this particular time enumerated, will become more readily apparent as the nature of the invention is better understood, and the same consists in the novel construction, combination, and arrangement of parts shown in the accompanying three sheets of drawings, in which—

Figure 1 is a schematic top plan view showing the conveying system, including the spraying booths, and drier employed in connection with the treatment of the washing machine tubs, certain parts in this view being broken away to more clearly reveal the nature of the invention.

Figure 2 is a fragmentary side elevation of the conveyer system proper extending from a point adjacent its entrance into the spraying booths to a point adjacent its point of emergence from its spraying booths.

Figure 3 is a fragmentary side elevation showing a portion of the conveyer proper and showing one of the washing machine tub trolleys with a washing machine placed thereon and also showing the mechanism by which the turntable and tub are rotated in passing through the spraying booth.

Figure 4 is a sectional view taken substantially on the line 4—4 of Figure 3.

Figure 5 is a fragmentary top plan view of the general arrangement of the conveyer proper, together with its driving mechanism, and Figure 6 is a side elevation of the device shown in Figure 5.

In all of the above described views, like characters of reference are employed to designate like parts throughout.

The conveyer for transporting the washing machine tubs involves in its general organization an upper carrier 10 and a lower carrier 11. These carriers are arranged vertically one above the other in parallel relation and are substantially identical in construction. The upper carrier comprises an I-beam 14 of standard construction having roller races 16 thereon. A plurality of carriages 18 are suspended from the upper carrier. These carriages are supported for longitudinal movement on the I-beam or trestle 14 by means of U-shaped brackets 20 having parallel arms 22 on which are internally journaled rollers 24 which are adapted to travel upon the races 16. Each of the brackets 20 is provided with a downwardly extending lug 26 to which lug is bolted or otherwise secured a lug 28 on a link 30. Each link 30 is of special construction and comprises one element in a series of links 32 in an endless conveyer chain 34 having rollers 35 incorporated therein. Each link 30 of the chain 34 is provided with a counterpart link 36 also forming an element of the chain 34. Each of these links 36 is provided with bifurcated lugs 38 dependent therefrom and extending between the bifurcations of each lug 38, and secured therebetween by means of a nut and bolt assembly 40 is a strap 42 carrying one of the carriages 18.

Each of the carriages comprises a frame having parallel side members 44 which converge at 46 inwardly and are welded at their upper ends to the strap 42. A reinforcing strut 48 in the form of a horizontal bar has its ends welded to the side members 44 adjacent their upper ends and the lower ends of the side members 44 are secured at oppositely disposed points to a horizontal elongated channel-shaped plate 50. Centrally of the plate 50 and to the underneath side thereof there is bolted a bearing member 52. This bearing member is provided with lateral flanges 54 which are bolted as at 56 to the underneath side of the plate 50. Extending through the bearing 52 and through an opening 58 in the plate 50 is a shaft 60, the lower end of which is swiveled in a socket 62 in a socket member 64. Secured to the upper end of the shaft in any suitable manner is a turntable 65 having a circumferential beveled edge 67 upon which a tub 69 to be treated is adapted to seat. The tub is provided with a central depression in its bottom providing a beveled seat 71 adapted to bear against the seat 67 to center the tub in position on the turntable. The socket member 64 is provided with a lug 66 bolted or otherwise secured as at 69 to a lug 70 on a link 72 forming one element of an endless conveyer chain 74 having rollers 35 incorporated therewith, which forms a part of the lower carrier 11. Secured to the shaft 60 by means of a through-bolt assembly 76 is a gear member 78, the purpose of which will be more fully described hereinafter. A plurality of guide members are provided for the upper and lower endless conveyer chains 34 and 74 respectively. These guide members are in the form of angle beams 80, which angle beams present their inner or outer vertical sides 81, as the case may be, to the rollers 35.

The cooperating elements of the upper carriage 10 are suitably supported from any suitable superstructure, not shown, and the lower carriage may similarly be supported from a supporting structure 82. Journaled in suitable frame members 84 is a vertical shaft 86 carrying sprocket wheels 88 and 90 for driving the endless conveyer chains 34 and 74 respectively. Mounted upon one end of the shaft 86 is a bevel gear 92 meshing with a second bevel gear 94 carried by the horizontal shaft 96 which may be connected to any suitable source of power. Thus it will be seen that the upper conveyer chain 34 and the lower conveyer chain 74 are driven in unison at an equal rate of speed, and inasmuch as the special links 30 and 36 of the upper conveyer chain 34 are positioned directly above the respective special links 72 of the lower conveyer chain 74, the carriages 18 which have their upper and lower ends movably mounted in the upper and lower carrier systems of the conveyer, will be uniformly moved along the path of the conveyer in vertical position.

Referring now to Figure 1, in which the entire conveyer system is shown in plan a plurality of open-ended spraying booths 13, 15, 17, 19, 21, and 23 are shown. These spraying booths are arranged in succession along the path of the conveyer, preferably adjacent the paint shop of the building in which the installation is made. These spraying booths, as before stated, are open-ended and are arranged with their open-ends staggered with respect to each other. The sides 25 of the spraying booth are cut-away as at 27 to permit the conveyer to pass through the series of booths from a point of entry 29 into the first booth 13 to a point of emergence 31 from the last booth 23. The path of the conveyer through these spraying booths is that of a serpentine similar to a sinus curve, the nodes of which are coincident with the side walls of the booths. In order to properly guide the upper and lower roller chains of the upper and lower curves of the conveyer respectively, the angle beams or guides 80 for these chains are interrupted adjacent the points where the curvature of the conveyer changes, and these angular beams are continued on the inner sides of the roller chain in each booth so that the chain may follow the path prescribed for it.

Horizontally positioned in each booth at a height on a level with the gears 78 of the various carriages 18 is a curved rack 33 having internal teeth thereon adapted to mesh with the teeth on the gears 78 as the carriages enter the respective compartments. Normally the carriages traveling along the conveyer do not rotate, but upon entry into the spraying booths, rotational movement is imparted to the carriages by virtue of the interengagement of the gears 78 with the racks 33. These racks 33 follow the curvature of the path of the conveyer as it passes through each booth and are arranged on the outer side of the curve that occurs in each booth. Suitable platforms 100 are provided in each booth upon which the operator may stand when he sprays the rotating tubs in the booths. The elevation of the platforms 100 may be varied to permit internal spraying as shown at 97 or external spraying as shown at 99 to be accomplished.

In actual operation the tubs are manually loaded on the carriages of the conveyer at a suitable point. From thence they are conveyed to the spraying booths. As a carriage 18 enters the spraying booth 13, the gears 78 are caused to mesh with the rack 33 positioned within the spraying booth and the tub is rotated as it passes through the booth in the direction of the arrow a. When the tub leaves the booth 13 and enters the booth 15 the gear 78 meshing with the rack 33 in this latter booth causes rotation of the turntable 65, together with the tub thereon in the direction of the arrow b and similarly, as the carriages emerge from one booth and enter the next booth, the direction of rotation of the turntable with the tub thereon is reversed. The operators on the platforms 100 in each of the booths may spray the tubs with the enamel or with any suitable finishing composition. For example, the operator in the booth 13 may simply spray the inside of the tub with a suitable filler material, and toward this end the platform 100 upon which he operates will be comparatively low. The operators in the booths 17 and 19 may spray the inside and outside of the tub respectively with a basic coat of enamel of one color while the operators in the booths 21 and 23 may spray the inside and outside of the tubs with a finishing coat of enamel of a different color. Irrespective, however, of these details in the specific enameling process of the tubs, the essential features of the invention are not altered. As the tubs successively emerge from the last booth 23, the respective gears 78 leave the last rack 33 in this last booth and the tubs are thence transported to a drier 95. This drier 95 may be of any suitable size and of any suitable form, and no claim is made in this application as to the novelty of the drier. From the drier the tubs are transported to a suitable point of discharge where they are moved from the turntables and subjected to a further processing.

The invention is not to be limited to the exact arrangement of parts shown in the accompanying drawings or described in this specification, as various changes in details of construction may be resorted to without departing from the spirit of the invention. For example, the type of conveyer mechanism employed may be altered as may the details of the carriages carried by the conveyer be altered. Only insofar as the invention is particularly pointed out in the accompanying claims, is the same to be limited.

Having thus described my invention, what I claim as new and desire to secure by Letters Patent of the United States, is—

1. An apparatus for continuously handling articles to be treated, comprising a conveying system including upper and lower tracks, a carriage suspended from the upper track adapted to travel along the path of said system, a turntable associated with said carriage, and means for causing rotation of said turntable as the carriage passes a predetermined point on the path of said conveyer system.

2. An apparatus for continuously handling articles to be sprayed, comprising a conveyer system including upper and lower tracks, a carriage suspended from said upper track and supported by said lower track adapted to travel along the tracks of said system, a turntable associated with said carriage, a gear rotatable with said turntable, and a stationary rack extending along the lower track of said conveyer and adapted to engage said gear to cause rotation of said turntable as the carriage travels along the path of the conveyer.

3. An apparatus for continuously handling articles to be sprayed, comprising a conveyer system including upper and lower carriers comprising an endless chain, a carriage suspended therefrom, means for moving said endless chain, a turntable associated with said carriage and adapted to receive thereon an article to be treated, and means extending along a portion of the path of said conveyer system for causing rotation of said turntable as the carriage passes said portion.

4. An apparatus for continuously handling articles to be treated, comprising an endless conveyer system including upper and lower carriers, each carrier including an endless chain movable in the path of said conveyer system, means for driving said chains at equal rates of speed, a carriage suspended from the chain of said upper carrier and connected to the chain of said lower carrier, a rotatable turntable associated with said carriage, and a stationary rack adjacent the lower carrier extending along a portion of the length of the carrier system, a gear mounted for rotation with said turntable and adapted to be engaged by said rack to cause rotation with said turntable and adapted to be engaged by said rack to cause rotation of the same.

5. A device for continuously handling articles to be sprayed, comprising a conveyer system including an overhead endless chain, a support for said chain, a second support, a carriage suspended from said second support and adapted to travel with said chain in the path of the conveyer system, said carriage having a turntable, means rotatably mounted thereon for moving said turntable, and means extending throughout a portion of the length of said conveyer system and cooperating with said last mentioned means for causing rotation of said turntable.

6. Apparatus for continuously handling articles to be treated, comprising an overhead track, a carriage suspended therefrom, an endless chain connected to said carriage, a guide for maintaining said chain in a path substantially parallel with said track, a turntable rotatably mounted on said carriage, means for moving said chain, and stationary means cooperating with said last mentioned means for rotating said turntable.

7. Apparatus of the character described, comprising an endless conveyer including upper and lower carriages movable in the path of said conveyer, a plurality of open-ended booths arranged successively in the path of said conveyer and through which said conveyer successively passes, one end of each booth being closed, said conveyer in passing through said booths successively following a serpentine path, a turntable rotatably mounted on each carriage, and means in each booth for causing rotation of the respective turntables as each carriage passes therethrough.

8. In an apparatus of the type described, the combination of upper and lower carrier tracks, an article carrier suspended from the upper track and moving between the upper and lower tracks, a turntable mounted upon the article carrier and adapted to carry articles to be coated, supporting-means for the turntable, means carried by the turntable supporting-means to rotate the turntable, and means for moving the carrier in a rectilinear direction between the tracks, said means also actuating the means for rotating the turntable.

9. In combination, a series of coating booths, upper and lower carrier tracks positioned in said booths, a traveling article carrier suspended from the upper track and moving between the tracks and through said booths, a permanent rack in each booth, a turntable mounted on the article carrier to carry and rotate articles to be coated, supporting-means for the turntable, means carried by the turntable supporting-means to rotate the table, and means for moving the carrier in a rectilinear direction and bringing said turntable rotating means in engagement with the permanent racks in said booths.

10. In apparatus of the type described, the combination of an article carrier having a bottom member and adapted to move between upper and lower tracks, upper and lower chains operatively connected to the carrier for moving the same between the tracks in a rectilinear direction, a shaft cooperating sleeve connected with the lower chain, a turntable adapted to be fastened to the other end of the shaft and provided with an extension shoulder bearing against that shaft whereby vertical motion thereof is prevented, and means mounted on the shaft for rotating the turntable, said means being actuated by a movement of the carrier in a rectilinear direction.

11. An apparatus for continuously handling articles to be treated, comprising an endless conveyer system including upper and lower carriers movable in the path of the said conveyer systems, means for driving the said carriers at equal rates of speed, an article supporting member suspended from the upper carrier and connected to the lower carrier, a rotatable turntable associated with the said article support, and a stationary rack adjacent the lower carrier extending along a portion of the length of the conveyer system, and instrumentalities mounted for rotation with the said turntable and adapted to be engaged by the rack to cause rotation with the turntable and adapted to be engaged by the rack to cause rotation of the same.

12. An apparatus for handling articles to be operated upon at various points along a selected path of travel, which comprises, in combination, an upper track, a lower track, a carriage suspended from said upper track and supported by said lower track, means for moving said carriage along said track comprising an endless chain operating between said upper and lower tracks, a turntable mounted on said carriage and adapted to be rotated at selected intervals, a gear associated with said table, and a plurality of spaced racks adapted to cooperate with said gear to rotate said table, said table being adapted to receive an article to be operated upon and to rotate the same when said gear engages with one of said racks.

13. Apparatus for handling articles to be treated, which comprises, in combination, an upper track, a lower track, a carriage, anti-friction members associated with said carriage and engaging said upper track, anti-friction members associated with the lower part of said carriage and engaging a portion of said lower track, a turntable mounted on said carriage and adapted to receive an article to be treated, a gear associated with said turntable for rotating the same, and a plurality of spaced racks located in the zone where said article is treated, whereby said gear is rotated through engagement with a rack to rotate said article.

CHARLES G. CHALLINOR.